(12) United States Patent
McGowan et al.

(10) Patent No.: US 7,822,831 B2
(45) Date of Patent: Oct. 26, 2010

(54) METHOD, SYSTEM AND PROGRAM PRODUCT FOR PRESERVING AND RESTORING MOBILE DEVICE USER SETTINGS

(75) Inventors: Patrick G. McGowan, Stoney Creek, NC (US); Christopher J. Paul, Durham, NC (US); Richard Redpath, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 2408 days.

(21) Appl. No.: 10/632,072

(22) Filed: Jul. 31, 2003

(65) Prior Publication Data

US 2005/0028165 A1 Feb. 3, 2005

(51) Int. Cl.
*G06F 15/177* (2006.01)
(52) U.S. Cl. .................. 709/220; 709/221; 709/222
(58) Field of Classification Search .......... 709/220–222
See application file for complete search history.

(56) References Cited

U.S. PATENT DOCUMENTS

| 5,784,563 | A | * | 7/1998 | Marshall et al. ............. 709/221 |
| 5,875,327 | A | * | 2/1999 | Brandt et al. .................. 713/1 |
| 5,950,010 | A | * | 9/1999 | Hesse et al. ................. 717/178 |
| 6,029,196 | A | * | 2/2000 | Lenz ......................... 709/221 |
| 6,052,720 | A | * | 4/2000 | Traversat et al. ............ 709/220 |
| 6,098,079 | A | * | 8/2000 | Howard ............................. 1/1 |
| 6,105,063 | A | * | 8/2000 | Hayes, Jr. .................. 709/223 |
| 6,105,066 | A |   | 8/2000 | Hayes, Jr. |
| 6,173,417 | B1 |   | 1/2001 | Merrill |
| 6,205,476 | B1 | * | 3/2001 | Hayes, Jr. .................. 709/220 |
| 6,215,994 | B1 |   | 4/2001 | Schmidt et al. |
| 6,226,739 | B1 |   | 5/2001 | Eagle |
| 6,535,996 | B1 |   | 3/2003 | Brewer et al. |
| 6,704,807 | B1 | * | 3/2004 | Mathur et al. ............... 719/328 |
| 6,763,403 | B2 | * | 7/2004 | Cheng et al. ................. 710/36 |
| 6,988,132 | B2 | * | 1/2006 | Horvitz ....................... 709/220 |
| 7,162,499 | B2 | * | 1/2007 | Lees et al. .................. 709/220 |
| 2002/0033843 | A1 |   | 3/2002 | Loos et al. |

(Continued)

FOREIGN PATENT DOCUMENTS

WO  WO 98/47057  10/1998

(Continued)

OTHER PUBLICATIONS

PCT/EP2004/051576, PCT Notification of Transmittal of the International Search Report and the Written Opinion of the International Searching Authority, or the Declaration, Completion Date Feb. 17, 2006.

(Continued)

*Primary Examiner*—Thu Nguyen
*Assistant Examiner*—Brian P Whipple

(57) ABSTRACT

Under the present invention, an enterprise application and corresponding client properties file is provided on a mobile device. Upon initiation of the mobile device, the client properties file is read into application memory. The user can then make modifications to the client properties file to change the user settings as he/she desires. If an updated properties file is later received from the server, it is reconciled with the client properties file. Thus, the user's modifications are not discarded or overwritten. In addition, the reconciled properties file could be synchronized to the server so that if the mobile device is lost or fails, the user's settings can be restored.

40 Claims, 6 Drawing Sheets

U.S. PATENT DOCUMENTS

| | | |
|---|---|---|
| 2002/0066023 A1 | 5/2002 | McIlroy |
| 2002/0116698 A1 | 8/2002 | Lurie et al. |
| 2002/0120684 A1 | 8/2002 | Christfort et al. |
| 2002/0129107 A1 | 9/2002 | Loughran et al. |
| 2003/0023657 A1 | 1/2003 | Fischer et al. |
| 2003/0032417 A1 | 2/2003 | Minear et al. |
| 2003/0046375 A1* | 3/2003 | Parkman et al. ............. 709/220 |
| 2003/0056207 A1 | 3/2003 | Fischer et al. |
| 2003/0065670 A1* | 4/2003 | Bisson et al. ............... 707/100 |
| 2004/0260565 A1* | 12/2004 | Zimniewicz et al. ........... 705/1 |
| 2006/0256739 A1* | 11/2006 | Seier et al. .................. 370/261 |

FOREIGN PATENT DOCUMENTS

WO     WO 01/69382 A1     9/2001

OTHER PUBLICATIONS

PCT/EP2004/051576, PCT Written Opinion of the International Searching Authority, Completion Date Feb. 17, 2006.

* cited by examiner

METHOD, SYSTEM AND PROGRAM PRODUCT FOR PRESERVING AND RESTORING MOBILE DEVICE USER SETTINGS

BACKGROUND OF THE INVENTION

1. Field of the Invention

The present invention provides a method, system and program product for preserving and restoring mobile device user settings. Specifically, the present invention provides redundancy for properties files of an enterprise application on a mobile device so that any user-based configuration settings can be preserved and/or restored.

2. Related Art

As the use of mobile devices becomes more prominent, there is an increasing need to provide improved preservation of user settings. Specifically, in business, many employees are provided with mobile devices such as personal digital assistants, laptop computers, etc. to perform their job functions. Typically, the mobile devices are equipped with any necessary enterprise applications and/or resources needed by the employee. For example, if the employee is a sales agent for a retail operation, the enterprise application might include tables that include pricing information for various products. In many cases, an enterprise application is accompanied with a properties file that sets forth the particular configuration/user settings (e.g., look and feel) of the enterprise application for the employee. In general, the properties file is defined on the server by an administrator or the like, and can be varied according to the particular employee. To this extent, the same enterprise application could have a different configuration depending on the user's group, job title, etc.

It has also become common for a mobile device user to personalize the settings of his/her mobile device. For example, an employee might make certain configuration changes to an enterprise application so that he/she can be more efficient. Such changes could include, among other things, certain toolbar layouts, color schemes, etc. In any event, the user will make such changes by modifying the properties file for the enterprise application. However, once a user has personalized the settings of a device in this manner, there is a strong desire for those changes to be preserved irrespective of updates from the server and/or loss of the mobile device. Currently, if a user modifies a properties file for an enterprise application, and an updated properties file is later received from the server, the user's modifications will be overwritten by the updated properties file. Accordingly, the user will be forced to make the changes again. This problem is even more apparent when the user's device fails, is lost, etc.

In view of the foregoing, there exists a need for a method, system and program product for preserving and restoring mobile device user settings. Specifically, a need exists for a system that allows mobile device user settings to be preserved irrespective of updates from a server. A further need exists for mobile device user settings to be restorable in the event of failure/loss of the mobile device.

SUMMARY OF THE INVENTION

In general, the present invention provides a method, system and program product for preserving and/or restoring mobile device user settings. Specifically, under the present invention, an enterprise application and corresponding client properties file is provided on a mobile device. Upon initiation of the mobile device, the client properties file is read into application memory. The user can then make modifications to the client properties file to change the user settings as he/she desires. If an updated properties file is later received from the server, it is reconciled with the client properties file. Thus, the user's modifications are not discarded or overwritten. In addition, the reconciled properties file could be synchronized to the server so that if the mobile device is lost or fails, the user's settings can be restored.

A first aspect of the present invention provides a method for preserving mobile device user settings, comprising: initiating an enterprise application on a mobile device, and reading a client properties file from a device memory of the mobile device into an application memory; receiving an updated properties file from a server in the device memory; comparing time values of the updated properties file to time values of the client properties file in the application memory; reconciling, based on the comparison, the client properties file and the updated properties file to yield a reconciled properties file; and writing the reconciled properties file to the device memory.

A second aspect of the present invention provides a method for preserving mobile device user settings, comprising: initiating an enterprise application on a mobile device, and reading a client properties file from a client database of the mobile device into an application memory; receiving an updated properties file from a server database to a device memory of the mobile device; reconciling the updated properties file with the client properties file in the client database to yield a reconciled properties file; replacing the client properties file in the client database with the reconciled properties file; and synchronizing the reconciled properties file to the server database.

A third aspect of the present invention provides a system for preserving mobile device user settings, comprising: a file reading system for reading a properties file corresponding to an enterprise application initiated on a mobile device into an application memory; a file request system for requesting and receiving an updated properties file from a server to a device memory of the mobile device; a time value system for comparing time values of the updated properties file to time values of the client properties file; a reconciliation system for reconciling the updated properties file with the client properties file to yield a reconciled properties file based on the comparison; and a file write system for writing the reconciled properties file to the device memory.

A fourth aspect of the present invention provides a system for preserving mobile device user settings, comprising: a file reading system for reading a properties file corresponding to an enterprise application initiated on a mobile device from a client database into an application memory; a file request system for requesting and receiving an updated properties file from a server database to a device memory of the mobile device; a reconciliation system for reconciling the updated properties file with the client properties file in the client database to yield a reconciled properties file; a file write system for replacing the client properties file in the client database with the reconciled properties file; and a synchronization system for synchronizing the reconciled properties file to the server database.

A fifth aspect of the present invention provides a program product stored on a recordable medium for preserving mobile device user settings, which when executed, comprises: program code for reading a properties file corresponding to an enterprise application initiated on a mobile device into an application memory; program code for requesting and receiving an updated properties file from a server to a device memory of the mobile device; program code for comparing time values of the updated properties file to time values of the client properties file; program code for reconciling the updated properties file with the client properties file to yield a reconciled properties file based on the comparison; and program code for writing the reconciled properties file to the device memory.

A sixth aspect of the present invention provides a program product stored on a recordable medium for preserving mobile device user settings, which when executed, comprises: program code for reading a properties file corresponding to an enterprise application initiated on a mobile device from a client database into an application memory; program code for requesting and receiving an updated properties file from a server database to a device memory of the mobile device; program code for reconciling the updated properties file with the client properties file in the client database to yield a reconciled properties file; program code for replacing the client properties file in the client database with the reconciled properties file; and program code for synchronizing the reconciled properties file to the server database.

Therefore, the present invention provides a method, system and program product for preserving and/or restoring mobile device user settings.

BRIEF DESCRIPTION OF THE DRAWINGS

These and other features of this invention will be more readily understood from the following detailed description of the various aspects of the invention taken in conjunction with the accompanying drawings in which.

Figure 1:
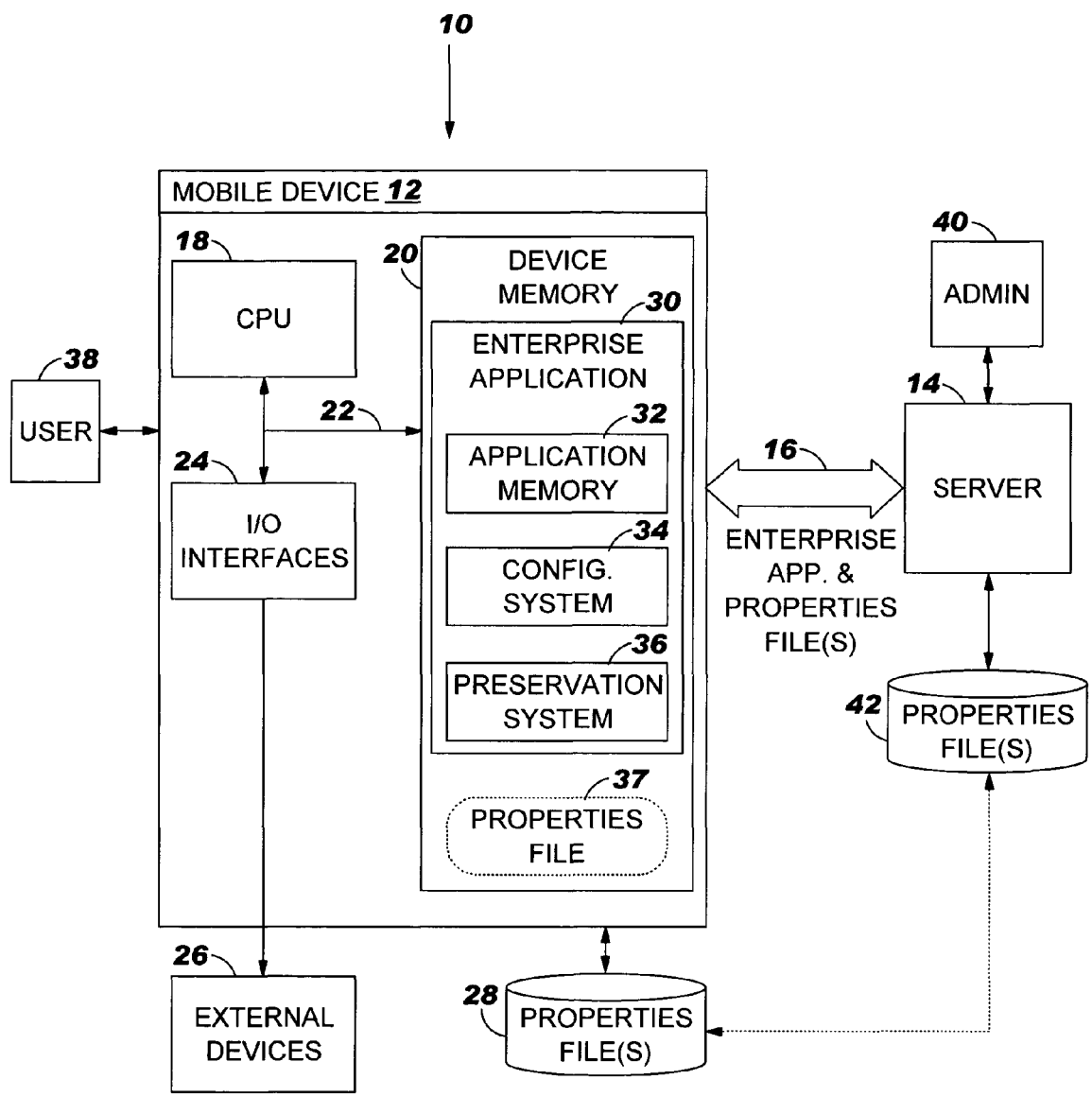
FIG. 1 depicts a system for preserving and restoring mobile device user settings according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system and program product for preserving and/or restoring mobile device user settings. Specifically, under the present invention, an enterprise application and corresponding client properties file is provided on a mobile device. Upon initiation of the mobile device, the client properties file is read into application memory. The user can then make modifications to the client properties file to change the user settings as he/she desires. If an updated properties file is later received from the server, it is reconciled with the client properties file. Thus, the user's modifications are not discarded or overwritten. In addition, the reconciled properties file could be synchronized to the server so that if the mobile device is lost or fails, the user's settings can be restored.

It should be understood in advance that as used herein the term "nterprise application" is intended to mean any application program(s) (e.g., JAVA applications, native applications, etc.), file(s), table(s), data structure(s), etc. that can be loaded onto a mobile device.

Referring now to FIG. 1, system 10 for preserving mobile device user settings is shown. As depicted, system 10 includes mobile device 12, which communicates with server 14. Mobile device 12 is intended to represent any type of computerized device that is considered to be mobile or portable. Examples include hand-held devices, cellular telephones, laptop computers, etc. In any event, mobile device 12 typically communicates with server 14 via communications link 16. To this extent, communication between mobile device 12 and server 14 can occur via a direct hardwired connection (e.g., serial port) such as between a personal digital assistant and a personal computer, or via an addressable connection that may utilize any combination of wireline and/or wireless transmission methods. In the case of the former, the personal computer would act as server 14. In the case of the latter, server 14 and mobile device 12 could be connected via the Internet, a wide area network (WAN), a local area network (LAN), a virtual private network (VPN) or other private network. Server 14 and mobile device 12 may utilize conventional network connectivity, such as Token Ring, Ethernet, WiFi or other conventional communications standards. Where mobile device 12 communicates with server 14 via the Internet, connectivity could be provided by conventional TCP/IP sockets-based protocol. In this instance, mobile device 12 would utilize an Internet service provider to establish connectivity to server 14.

As shown, mobile device 12 generally comprises central processing unit (CPU) 18, device memory 20, bus 22, input/output (I/O) interfaces 24 and external devices/resources 26. CPU 18 may comprise a single processing unit, or be distributed across one or more processing units in one or more locations, e.g., on a client and server. Device memory 22 may comprise any known type of data storage and/or transmission media, including magnetic media (e.g., a disk, a memory stick/card, etc.), optical media, random access memory (RAM), read-only memory (ROM), a data cache, a data object, etc. Moreover, similar to CPU 18, device memory 20 may reside at a single physical location, comprising one or more types of data storage, or be distributed across a plurality of physical systems in various forms.

I/O interfaces 24 may comprise any system for exchanging information to/from an external source. External devices/resources 26 may comprise any known type of external device, including speakers, a CRT, LED screen, hand-held device, keyboard, mouse, voice recognition system, speech output system, printer, monitor, facsimile, pager, etc. Bus 22 provides a communication link between each of the components in mobile device 12 and likewise may comprise any known type of transmission link, including electrical, optical, wireless, etc. In addition, although not shown, additional components, such as cache memory, communication systems, system software, etc., may be incorporated into mobile device 12.

It should be understood that although not shown for brevity purposes, server 14 typically includes computerized components (e.g., CPU, memory, bus, I/O interfaces, external devices, etc.) similar to mobile device 12.

Client database 28 and server database 42 will be discussed further with respect to FIGS. 5-6. However, in general, client database 28 and server database 42 provide storage for properties files under the present invention. As such, client database 28 and server database 42 are typically DB2 databases, but may include one or more storage devices, such as a magnetic disk drive or an optical disk drive. In another embodiment, client database 28 and server database 42 include data distributed across, for example, a local area network (LAN), wide area network (WAN) or a storage area network (SAN) (not shown). Further, although shown exterior to mobile device 12 and server 14, client database 28 and server database 42 could reside within each respective system.

Shown in device memory 20 is enterprise application 30 and client properties file 37, which can both be obtained from server 14 via communications link 16. Typically, client properties file 37 is loaded on mobile device 12 on or around the time enterprise application 30 is loaded. However, this need not be the case. In general, client properties file 37 sets forth the configuration (e.g., look and feel) that enterprise application 30 will have for user 38. To this extent, client properties file 37 is generally programmed by administrator 40. Further, client properties file 37 can be programmed to provide a certain configuration depending on several factors such as user 38's job title, job group, permission level, etc. In any event, the initial client properties file 37 provides an initial configuration for enterprise application 30.

Figure 2:
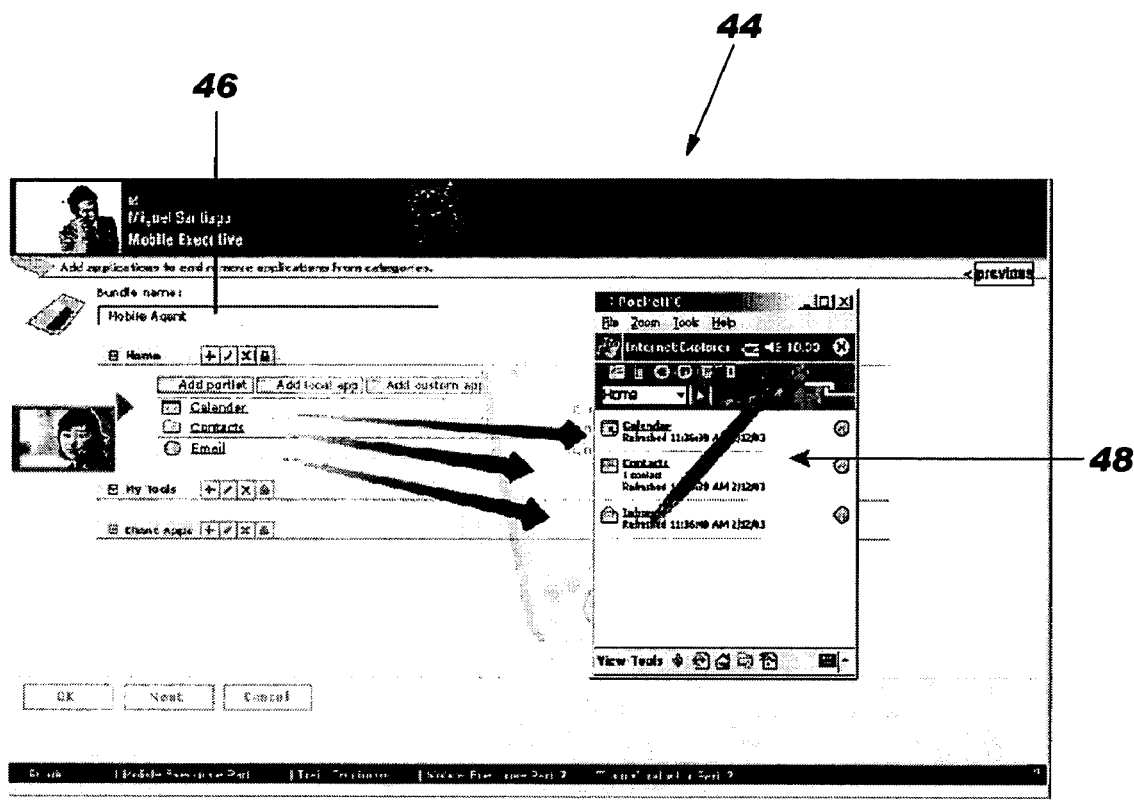
FIG. 2 depicts an interface for defining a properties file for an enterprise application installed on the mobile device of FIG. 1.

Referring to FIG. 2, an illustrative interface 44 is shown that administrator 40 (FIG. 1) can use to create and/or update client properties file 37 (FIG. 1). Using interface 44, administrator 40 can designate a particular user 46 and a set of programs 48 that are available thereto. To this extent, interface 44 can be used to establish the "permission" level user 46 has for accessing certain programs or information, or to perform certain tasks. Interface 44 can also be used to designate the look and feel that enterprise application 30 (FIG. 1) will have for user 46. For example, interface 44 can be used to display a particular arrangement of buttons, toolbars, etc. for user 38 (FIG. 1). It can also be used to provide user 38 with a particular color scheme.

Referring back to FIG. 1, user 38 could be provided with the capability to "personalize" enterprise application 30. For example, user 38 could be allowed to change the color schemes, screen layout, etc. of enterprise application 30. Personalization is a common task since many users prefer certain application configurations. To this extent, configuration system 34 is shown. It should be understood that configuration system 34 is intended to represent any system now known or later developed that provides the capability to change a configuration of an application (e.g., to edit client properties file 37). Configuration system 34 could be integrated as part of enterprise application 30 as shown, or it could exist as a separate program. In any event, user 38 will interact with configuration system 34 to modify client properties file 37.

As indicated above, it is desirable for redundancy to be provided so that any modifications made to client properties file 37 by user 38 are preserved and can be restored. For example, an updated properties file could be provided on a periodic basis from server 14. In this event, it is desirable to maintain user 38's modifications to the original client properties file 37, while accepting any other changes administrator 40 might have made. Accordingly, the present invention provides preservation system 36. As will be further illustrated below, there are at least two embodiments in which preservation system 36 can be implemented.

Figure 3:
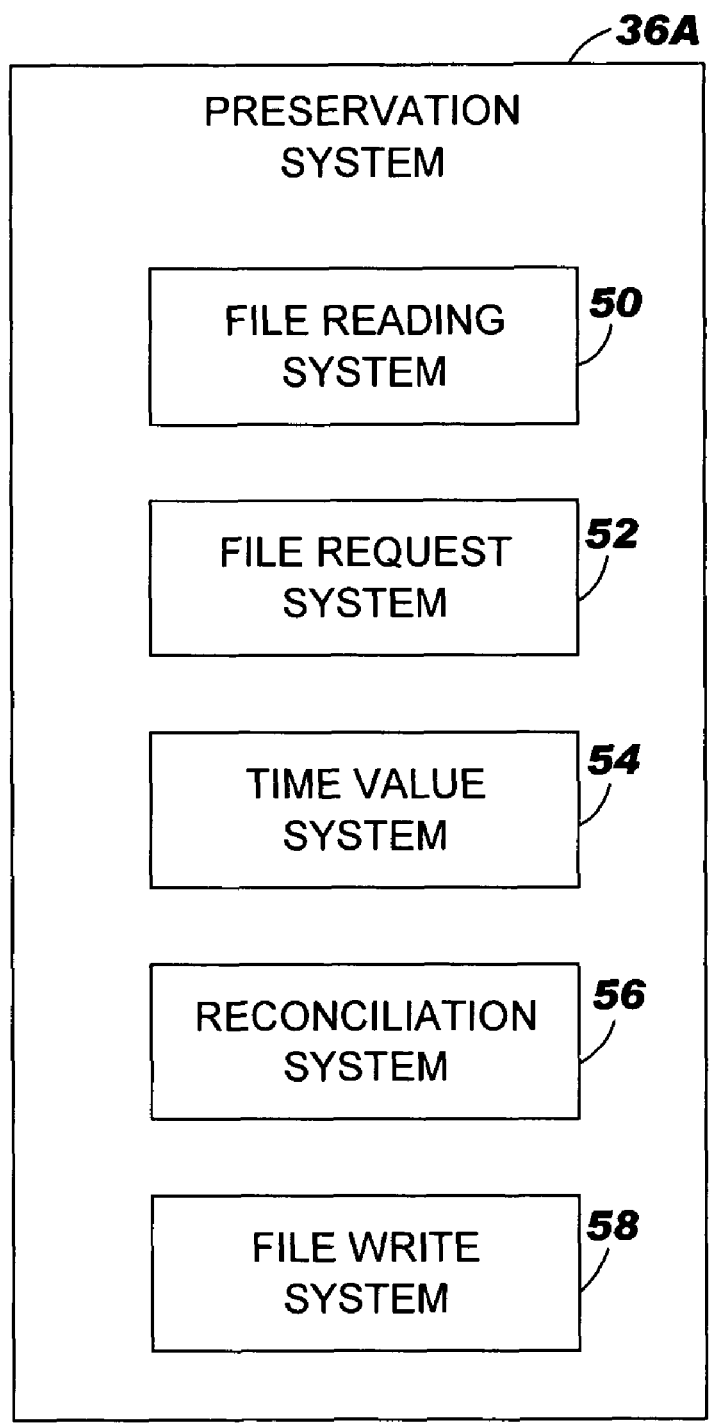
FIG. 3 depicts a diagram of the setting preservation system of FIG. 1 according to one aspect of the present invention.

Referring to FIGS. 1 and 3 collectively, preservation system 36A according to one embodiment of the present invention is shown. As depicted, preservation system 36A includes file reading system 50, file request system 52, time value system 54, reconciliation system 56 and file write system 58. Assume that user 38 has downloaded enterprise application 30 and an original client properties file 37 onto mobile device 12. Further assume that user 38 then initiates enterprise application 30. After initiation, file reading system 50 will read client properties file 37 into application memory 32 to provide the initial configuration of enterprise application 30. User 38 can then utilize configuration system 34 to modify client properties file 37 to establish/edit various user settings within client properties file 37. As indicated above, it is desirable that any user settings made by user 38 be maintained irrespective of the receipt of updated properties files from server 14. Specifically, file request system 52 will periodically request (e.g., via a device management services job) an updated properties file from server 14. The interval at which the updated properties file is provided can be preset by administrator 40. In any event, under the present invention if an updated properties file is available, it will be "pushed down" from server 14 to device memory 20.

Once in device memory 20, time value system 54 will compare time values of the updated properties file to the client properties file 37 in application memory 32. Specifically, time value system 54 will compare the (last-modified) date and/or time of the client properties file 37 to the updated properties file. If the time values are the same, the files are likely the same and no action need be taken. However, if the time values are different, the files are different. This will typically occur where user 38 has modified the original client properties file 37 to yield a modified client properties file. In this case, reconciliation system 56 will reconcile the two files to yield a reconciled properties file in application memory 32. In reconciling the files, the user settings modified by user 38 will be preserved along with any updated configuration settings provided by administrator 40 in the updated properties file. Thus, user 38 will enjoy the benefit of both the changes he/she made, as well as the changes made by administrator 40. In the event of a conflict (e.g., where user 38 and administrator 40 both modified the same user setting, reconciliation system 56 could use one setting or the other. In any event, after a reconciled properties file is provided, file write system 58 will write the same to device memory 20 (with the time/date values of the server file so that they are the same). Typically, the reconciled properties file will overwrite the updated properties file pushed down from server 14.

If another updated properties file is later received, the process is repeated. That is, the newer updated properties file is received in device memory 20, the time values are compared, the files are reconciled to yield a new reconciled properties file, and the new reconciled properties file is written to device memory 20.

Figure 4:
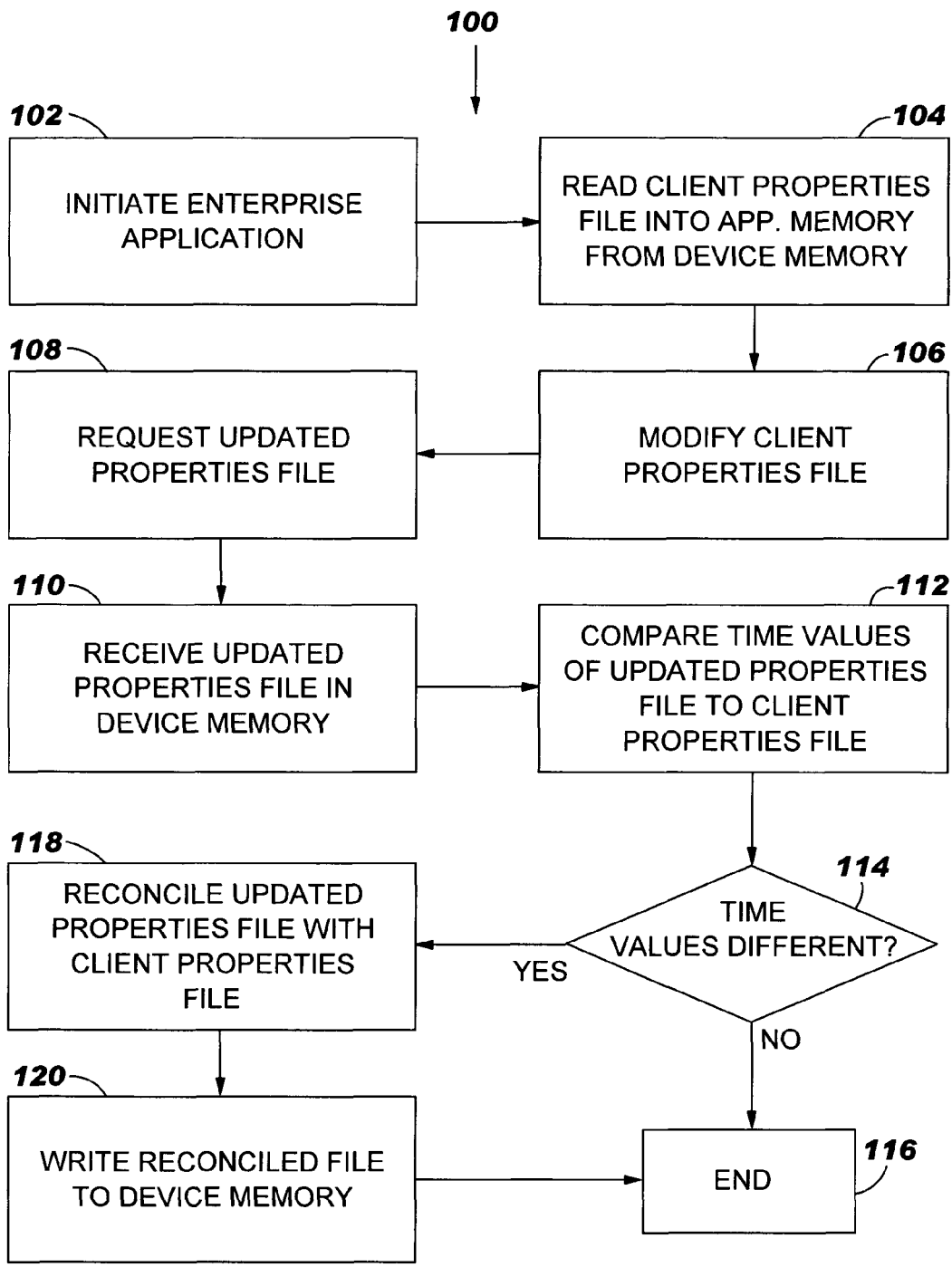
FIG. 4 depicts a diagram of a method implemented according to the setting preservation system of FIG. 3.

Referring now to FIG. 4, an illustrative flow diagram 100 of a method carried out according to preservation system 36A of FIG. 3 is shown. As depicted, in step 102, enterprise application is initiated. In step 104, the client properties file is read into application memory from the device memory. In step 106, the client properties file is modified by the user, and in step 108 an updated properties file is requested from the server. The updated properties file is received and stored in device memory in step 110 and, in step 112, the time values of the client properties file in the application memory are compared to those of the updated properties file in the device memory. In step 114, it is determined whether the time values are different. If not, the process is ended in step 116. If, however, the time values are different, the client properties file is reconciled with the updated properties file to yield a reconciled properties file in step 118. Then, in step 120, the reconciled properties file is written to the device memory and the process is ended. As can be seen, the embodiment of preservation system 36A shown in FIG. 3 thus allows mobile device user settings to be preserved irrespective of updates from server 14.

Figure 5:
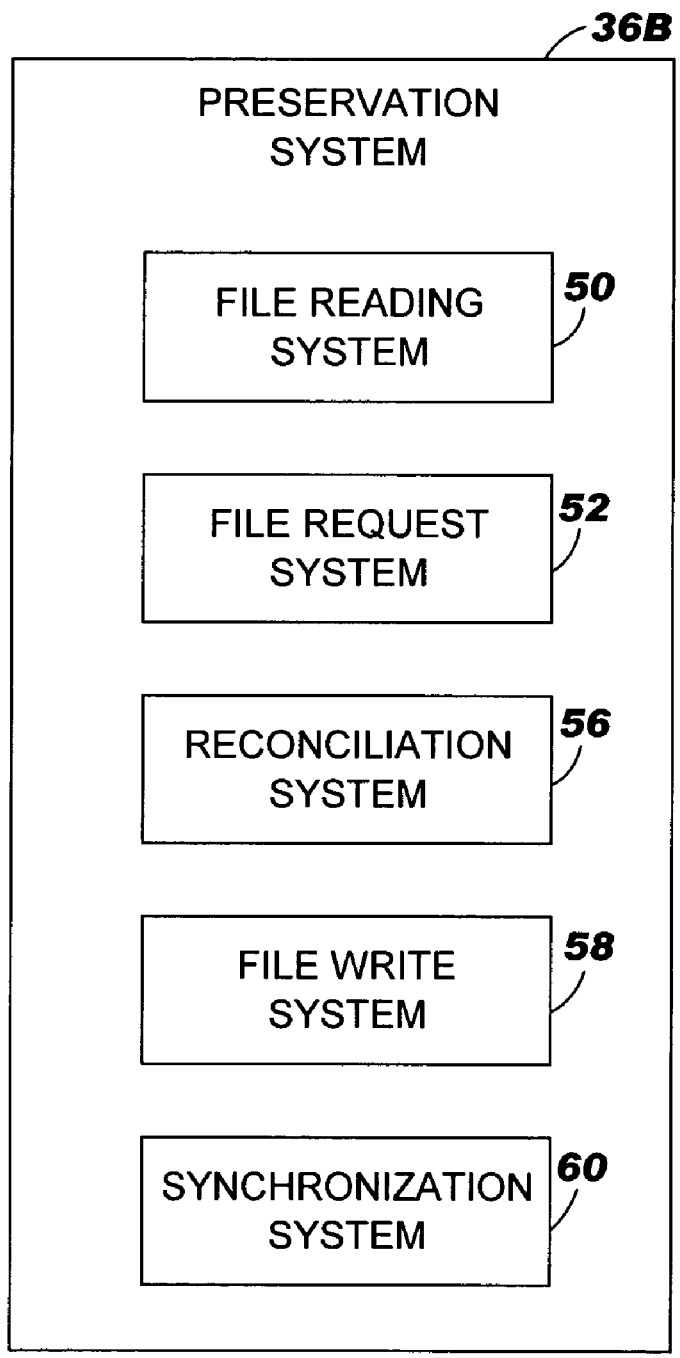
FIG. 5 depicts a diagram of the setting preservation system of FIG. 1 according to another aspect of the present invention.

Referring now to FIGS. 1 and 5 collectively, preservation system 36B according to another embodiment of the present invention is shown. Specifically, preservation system 36B allows mobile device user settings to not only be preserved irrespective of updates from server 14, but also restored in the event of failure or loss of mobile device 12. As shown, similar to preservation system 36A (FIG. 3), preservation system 36B includes file reading system 50, file request system 52, reconciliation system 56 and file write system 58. However, preservation system 34B further includes synchronization system 60.

Under the embodiment shown in FIG. 5, after enterprise application 30 is initiated, file reading system 50 will search client database 28 for client properties file 37. If client properties file 37 is in client database 28, it will be read into application memory 32. However, if client properties file 37 is not present in client database 28, file reading system 50 will read client properties file 37 from device memory 20 into application memory 32. Thereafter, file reading system 50 (or file write system 58) will write the client properties file 37 to client database 28, and then delete client properties file 37 from device memory 20. This latter scenario could occur the first time user 38 initiates enterprise application 30 since client properties file 37 will typically be initially stored in device memory 20. In any event, similar to preservation system 36A (FIG. 3), file request system 52 will periodically request an updated properties file from server 14. Assuming one is available, the updated properties file will be "pushed down" from server 14 to device memory 20. At this point, reconciliation system 56 will reconcile the updated properties file with the client properties file 37 in client database 28 to yield a reconciled properties file. This may or may not be preceded by a comparison of time values by time value system (not shown in FIG. 5). Regardless, if user 38 had made any user setting changes (e.g., modified client properties file 37) prior to receiving the updated properties file, such changes will be preserved by the reconciliation similar to preservation system 36A. After reconciliation, the reconciled properties file will replace the client properties file 37 in client database 28.

User 38 can even modify certain user settings after reconciliation. That is, user 38 can also modify the reconciled properties file stored in client database 28 via configuration system 34. In any event, the (possibly modified) reconciled properties file will be synchronized from client database 28 to server database 42 via synchronization system 60. This will ensure that server 14 has a copy of the latest configuration of enterprise application 30 for user 38. Thus, if mobile device 12 fails, is lost, etc. user 38 can restore the latest configuration from server database 42. Synchronization can occur according to a predefined schedule, or upon modification of the user settings by user 38.

Now further assume that after the reconciled properties file is synchronized to server database 42, administrator 40 creates a new updated properties file for push down to device memory 20. In this case, server 14 will reconcile the new updated properties file with the reconciled properties file in server database 42 prior to push down. Thus, the updated properties file received in device memory 20 will contain an up-to-date, cumulative configuration for enterprise application 30.

Figure 6:
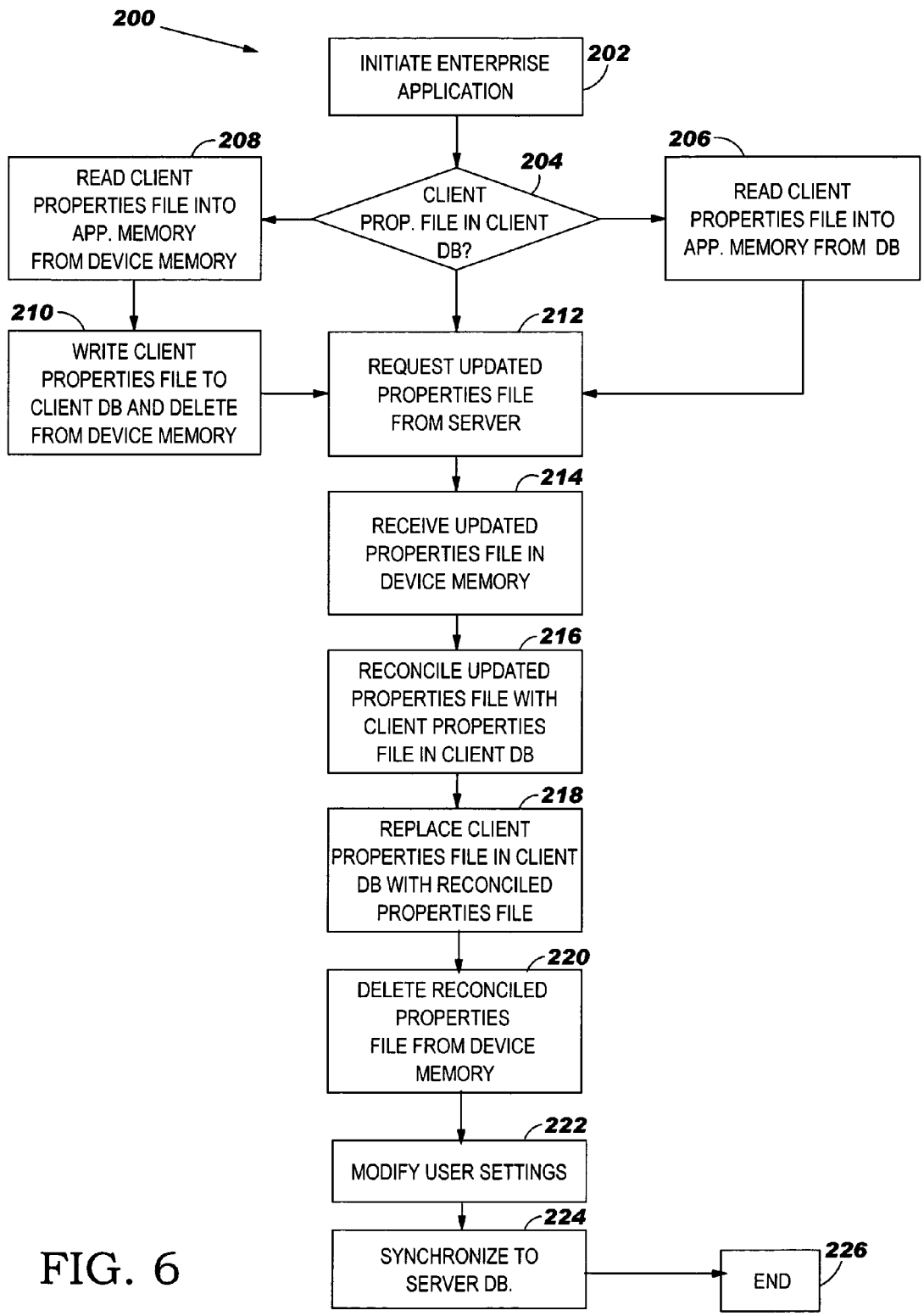
FIG. 6 depicts a diagram of a method implemented according to the setting preservation system of FIG. 5.

Referring to FIG. 6, an illustrative flow diagram 200 of a method according to the preservation system 36B of FIG. 5 is shown. In first step 202, enterprise application is initiated. In step 204, it is determined whether the client properties file is in the client database. If it is, it is read into the application memory in step 206. If not, the client properties file is read into application memory from the device memory in step 208. Then, in step 210, the client properties file is written to the client database, and is deleted from the device memory. In step 212, an updated properties file is requested from the server, and is received in device memory in step 214. In step 216, the updated properties file is reconciled with the client properties file, and the resulting reconciled properties file then replaces the client properties file in the client database in step 218. In step 220, the reconciled properties file is deleted from the device memory. In step 222, the user modifies the user settings of the reconciled properties file. The modified reconciled properties file is then synchronized to the server in step 224, and the process ends in step 226. It should be understood that although not shown in FIG. 6, the user could have modified the client properties file prior to receiving the updated properties file. In this event, the modified client properties file would still be reconciled with the updated properties file to yield the reconciled properties file, which would then replace the client properties file in the database and be synchronized to the server.

It should be appreciated that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A method for preserving hand-held mobile device user settings, comprising:

initiating an enterprise application on a mobile device, and reading a client properties file from a device memory of the mobile device into an application memory;

receiving an updated properties file from a server in the device memory;

comparing time values of the updated properties file to time values of the client properties file in the application memory to determine whether the client properties have been changed by a user;

reconciling, based on the comparison, the client properties file and the updated properties file to yield a reconciled properties file; and writing the reconciled properties file to the device memory.

2. The method of claim 1, further comprising modifying the client properties file prior to receiving the updated properties file, wherein time values of the updated properties file are compared to time values of the modified client properties file, and wherein the modified client properties file is reconciled with the updated properties file to yield the reconciled properties file.

3. The method of claim 1, further comprising requesting the updated properties file from the server prior to the receiving step.

4. The method of claim 1, wherein the device memory is selected from the group consisting of a disk, a memory stick and random access memory.

5. The method of claim 1, wherein the client properties file and the updated properties file each contain a configuration of the enterprise application, and wherein the client properties file further contains the mobile device user settings.

6. The method of claim 1, wherein the comparing step comprises comparing a date of the updated properties file to a date of the client properties file.

7. The method of claim 1, wherein the reconciling step comprises reconciling the updated properties file and the client properties file to yield the reconciled properties file if the time values of the updated properties file are different than the time values of the client properties file.

8. A method for preserving hand-held mobile device user settings, comprising:
    initiating an enterprise application on a mobile device, and reading a client properties file from a client database of the mobile device into an application memory;
    receiving an updated properties file from a server database to a device memory of the mobile device;
    reconciling the updated properties file with the client properties file in the client database to yield a reconciled properties file to retain changes made to the client properties file by a user;
    replacing the client properties file in the client database with the reconciled properties file; and
    synchronizing the reconciled properties file to the server database.

9. The method of claim 8, further comprising modifying mobile device user settings of the reconciled properties file on the mobile device, wherein the synchronizing step comprises synchronizing the modified reconciled properties file to the server database.

10. The method of claim 8, wherein the reading step comprises:
    determining if the client properties file is in the client database;
    reading the client properties file from the device memory if the client properties file is not in the client database;
    copying the client properties file to the client database; and
    deleting the client properties file from the device memory after the copying step.

11. The method of claim 8, wherein the updated properties file is reconciled with another properties file prior to being received on the mobile device.

12. The method of claim 8, wherein the device memory is selected from the group consisting of a disk, a memory stick and random access memory.

13. The method of claim 8, further comprising requesting the updated properties file from the server database prior to the receiving step.

14. The method of claim 8, wherein the client database and the server database are DB2 databases.

15. A system for preserving hand-held mobile device user settings, comprising:
    a file reading system for reading a properties file corresponding to an enterprise application initiated on a mobile device into an application memory;
    a file request system for requesting and receiving an updated properties file from a server to a device memory of the mobile device;
    a time value system for comparing time values of the updated properties file to time values of the client properties file to determine whether the client properties have been changed by a user;
    a reconciliation system for reconciling the updated properties file with the client properties file to yield a reconciled properties file based on the comparison; and
    a file write system for writing the reconciled properties file to the device memory.

16. The system of claim 15, further comprising a configuration system for modifying the client properties file, wherein time values of the updated properties file are compared to time values of the modified client properties file, and wherein the modified client properties file is reconciled with the updated properties file to yield the reconciled properties file.

17. The system of claim 15, wherein the device memory is selected from the group consisting of a disk, a memory stick and random access memory.

18. The system claim 15, wherein the client properties file and the updated properties file each contain a configuration of the enterprise application, and wherein the client properties file further contains the mobile device user settings.

19. The system of claim 15, wherein the time value system compares a date of the updated properties file to a date of the client properties file.

20. The system of claim 15, wherein the reconciliation system reconciles the updated properties file and the client properties file in the application memory to yield a reconciled properties file if the time values of the updated properties file are different than the time values of the client properties file.

21. The system of claim 15, wherein the file write system replaces the updated client file in the device memory with the reconciled properties file.

22. A system for preserving hand-held mobile device user settings, comprising:
    a file reading system for reading a properties file corresponding to an enterprise application initiated on a mobile device from a client database into an application memory;
    a file request system for requesting and receiving an updated properties file from a server database to a device memory of the mobile device;
    a reconciliation system for reconciling the updated properties file with the client properties file in the client database to yield a reconciled properties file that retains changes made to the client properties file made by a user;
    a file write system for replacing the client properties file in the client database with the reconciled properties file; and
    a synchronization system for synchronizing the reconciled properties file to the server database.

23. The system of claim 22, further comprising a configuration system for modifying mobile device user settings of the reconciled properties file on the mobile device, wherein the synchronization system synchronizes the modified reconciled properties file to the server database.

24. The system of claim 22, wherein the file reading system:
    determines if the client properties file is in the client database;

reads the client properties file from the device memory if the client properties file is not in the client database;

copies the client properties file to the client database; and deletes the client properties file from the device memory after the copying step.

25. The system of claim 22, wherein the updated properties file is reconciled with another properties file prior to being received on the mobile device.

26. The system of claim 22, wherein the device memory is selected from the group consisting of a disk, a memory stick and random access memory.

27. The system of claim 22, wherein the client database and the server database are DB2 databases.

28. A program product stored on a recordable medium for preserving hand-held mobile device user settings, which when executed, comprises:

program code for reading a properties file corresponding to an enterprise application initiated on a mobile device into an application memory;

program code for requesting and receiving an updated properties file from a server to a device memory of the mobile device;

program code for comparing time values of the updated properties file to time values of the client properties file to determine whether the client properties have been changed by a user;

program code for reconciling the updated properties file with the client properties file to yield a reconciled properties file based on the comparison; and program code for writing the reconciled properties file to the device memory.

29. The program product of claim 28, further comprising program code for modifying the client properties file, wherein time values of the updated properties file are compared to time values of the modified client properties file, and wherein the modified client properties file is reconciled with the updated properties file to yield the reconciled properties file.

30. The program product of claim 28, wherein the device memory is selected from the group consisting of a disk, a memory stick and random access memory.

31. The program product claim 28, wherein the client properties file and the updated properties file each contain a configuration of the enterprise application, and wherein the client properties file further contains the mobile device user settings.

32. The program product of claim 28, wherein the program code for comparing time values compares a date of the updated properties file to a date of the client properties file.

33. The program product of claim 28, wherein the program code for reconciling reconciles the updated properties file and the client properties file in the application memory to yield a reconciled properties file if the time values of the updated properties file are different than the time values of the client properties file.

34. The program product of claim 28, wherein the program code for writing replaces the updated client file in the device memory with the reconciled properties file.

35. A program product stored on a recordable medium for preserving hand-held mobile device user settings, which when executed, comprises:

program code for reading a properties file corresponding to an enterprise application initiated on a mobile device from a client database into an application memory;

program code for requesting and receiving an updated properties file from a server database to a device memory of the mobile device;

program code for reconciling the updated properties file with the client properties file in the client database to yield a reconciled properties file such that changes made to the client properties file made by a user are retained;

program code for replacing the client properties file in the client database with the reconciled properties file; and program code for synchronizing the reconciled properties file to the server database.

36. The program product of claim 35, further comprising program code for modifying mobile device user settings of the reconciled properties file on the mobile device, wherein the program code for synchronizing synchronizes the modified reconciled properties file to the server database.

37. The program product of claim 35, wherein the program code for reading:

determines if the client properties file is in the client database;

reads the client properties file from the device memory if the client properties file is not in the client database;

copies the client properties file to the client database; and deletes the client properties file from the device memory after the copying step.

38. The program product of claim 35, wherein the updated properties file is reconciled with another properties file prior to being received on the mobile device.

39. The program product of claim 35, wherein the device memory is selected from the group consisting of a disk, a memory stick and random access memory.

40. The program product of claim 35, wherein the client database and the server database are DB2 databases.

* * * * *